United States Patent
Prabhakar et al.

(10) Patent No.: US 10,263,905 B2
(45) Date of Patent: Apr. 16, 2019

(54) DISTRIBUTED FLEXIBLE SCHEDULER FOR CONVERGED TRAFFIC

(71) Applicant: DIAMANTI INC, San Jose, CA (US)

(72) Inventors: Venkatesh Prabhakar, Saratoga, CA (US); Shilpa Mayanna, San Jose, CA (US); Hiral Patel, San Jose, CA (US); Chakravarthy Nelluri, Milpitas, CA (US)

(73) Assignee: DIAMANTI INC., San Jose, CA (US)

(*) Notice: Subject to any disclaimer, the term of this patent is extended or adjusted under 35 U.S.C. 154(b) by 0 days.

(21) Appl. No.: 15/464,187

(22) Filed: Mar. 20, 2017

(65) Prior Publication Data
US 2018/0270162 A1    Sep. 20, 2018

(51) Int. Cl.
*H04J 3/04* (2006.01)
*H04L 12/873* (2013.01)
*H04L 12/26* (2006.01)
*H04L 12/851* (2013.01)

(52) U.S. Cl.
CPC ........ *H04L 47/522* (2013.01); *H04L 43/0894* (2013.01); *H04L 47/2408* (2013.01)

(58) Field of Classification Search
USPC ....... 370/230, 250, 252, 464, 468, 477, 480, 370/532, 535, 536, 537, 538, 540, 542, 370/543, 545
See application file for complete search history.

(56) References Cited

U.S. PATENT DOCUMENTS

| | | | |
|---|---|---|---|
| 8,189,476 B1* | 5/2012 | Rothstein | H04L 47/127 370/235 |
| 2005/0060445 A1* | 3/2005 | Beukema | H04L 47/30 710/52 |
| 2008/0112400 A1* | 5/2008 | Dunbar | H04L 12/66 370/360 |
| 2012/0170585 A1* | 7/2012 | Mehra | H04L 45/24 370/400 |
| 2012/0195195 A1* | 8/2012 | Rai | H04L 45/125 370/235 |
| 2013/0208663 A1* | 8/2013 | Kanniappan | H04L 67/306 370/329 |
| 2015/0288583 A1* | 10/2015 | Le | H04L 43/08 370/252 |
| 2016/0274803 A1* | 9/2016 | Earhart | G06F 11/1068 |

(Continued)

*Primary Examiner* — Kwang B Yao
*Assistant Examiner* — Nguyen H Ngo
(74) *Attorney, Agent, or Firm* — Imperium Patent Works; Jin Zheng (57) ABSTRACT

A distributed flexible scheduler that dynamically balances network and storage traffic across links is proposed. The scheduler takes into account the bandwidth requirements of workloads provisioned in a cluster and dynamically distributes the network traffic and the storage traffic accordingly. There are three schemes involved in the proposed distributed flexible scheduler. In a first approach of Equal Distribution, network and storage traffic is distributed evenly across the links. In a second approach of Storage Preferred distribution, the aggregate storage bandwidth requirements of workloads exceed the network bandwidth requirements. In a third approach of Network Preferred distribution, the aggregate network bandwidth requirements of workloads exceed the storage bandwidth requirements.

16 Claims, 7 Drawing Sheets

(56) References Cited

U.S. PATENT DOCUMENTS

2017/0085467 A1* 3/2017 Ford ................... H04L 45/245
2017/0171302 A1* 6/2017 Seo .................... H04L 67/1002
2018/0129448 A1* 5/2018 Duzly .................. G06F 3/0653

* cited by examiner (PRIOR ART)
FIG. 1

DISTRIBUTED FLEXIBLE SCHEDULER FOR CONVERGED TRAFFIC

TECHNICAL FIELD

The disclosed embodiments relate to distributed environments where network traffic and storage traffic are mixed in a Top of Rack (ToR) switch.

BACKGROUND

When high performance storage traffic is mixed with network traffic, there could be oversubscription at the Top-of-Rack (ToR) switch resulting in storage traffic being dropped. As a result, the minimum QoS (Quality of Service) guarantees for storage traffic may not be met.

Figure 1:
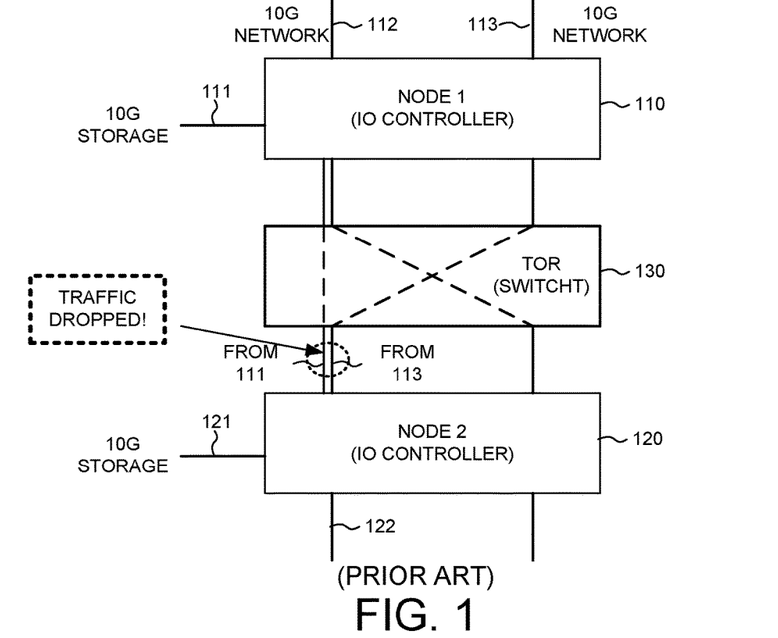
FIG. 1 (prior art) illustrates a distributed system with multiple nodes and a top of rack (ToR) switch for switching converged storage traffic and network traffic.

FIG. 1 (Prior Art) illustrates a distributed system 100 with multiple nodes and a top of rack (ToR) switch for switching converged storage traffic and network traffic. Distributed system 100 comprises a first node 110, a second node 120, and a ToR switch 130. Node 1 comprises a converged IO controller, which shapes the storage link 111 and the network link 112 to 5G each. Similarly, Node 2 also comprises a converged IO controller, which shapes the storage link 121 and the network link 122 to 5G each. However, network link 113 from Node 1 also comes into the ToR switch at 10G. When the network traffic (10G) from link 113 is mixed with storage traffic from link 111 (5G) at the ToR switch, storage traffic could be dropped due to oversubscription.

There are different solutions to solve the oversubscription problem. In a first solution, the ToR switch can be configured to carry storage and network traffic in different classes and allocate bandwidth for each class on the ToR. Problem with this solution is that we need to have the network admin go through complex switch configuration across different types of ToR switches. Further we need to rely DCBX (Data Center Ethernet Bridging) and PFC (Per Priority Flow Control) to make this work (similar to how FCoE (Fibre Channel over Ethernet) addresses this problem). In a second non-converged solution, network and storage traffic are carried on separate links (2×10G each for network and storage). This approach works in that there is no interference caused to storage traffic by network traffic in the ToR switch (as the MACS are learnt on separate links). Problem with this approach is that it implements a non-flexible hard partitioning, so half the bandwidth will be wasted if there is no remote storage traffic to or from a node.

It is thus desirable to have a flexible converged scheduler taking into account the various QoS classes of network and storage traffic before mixing them on the same link.

SUMMARY

A distributed flexible scheduler that dynamically balances network and storage traffic across links is proposed. The scheduler takes into account the bandwidth requirements of workloads provisioned in a cluster and dynamically distributes the network traffic and the storage traffic accordingly. There are three schemes involved in the proposed distributed flexible scheduler. In a first approach of Equal Distribution, network and storage traffic is distributed evenly across the links. In a second approach of Storage Preferred distribution, the aggregate storage bandwidth requirements of workloads exceed the network bandwidth requirements. In a third approach of Network Preferred distribution, the aggregate network bandwidth requirements of workloads exceed the storage bandwidth requirements.

In one embodiment, a converged IO controller receives a first type of traffic from a first plurality of connectors coupled to a first plurality of links. The controller receives a second type of traffic from a second plurality of connectors coupled to a second plurality of links. The controller determines a distribution preference based on a first provisioned bandwidth of the first type of traffic and a second provisioned bandwidth of the second type of traffic. The controller outputs the first type of traffic onto a first subset of a plurality of converged links, and outputs the second type of traffic onto a second subset of the plurality of converged links. The first subset and the second subset are determined based on the distribution preference.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 2:
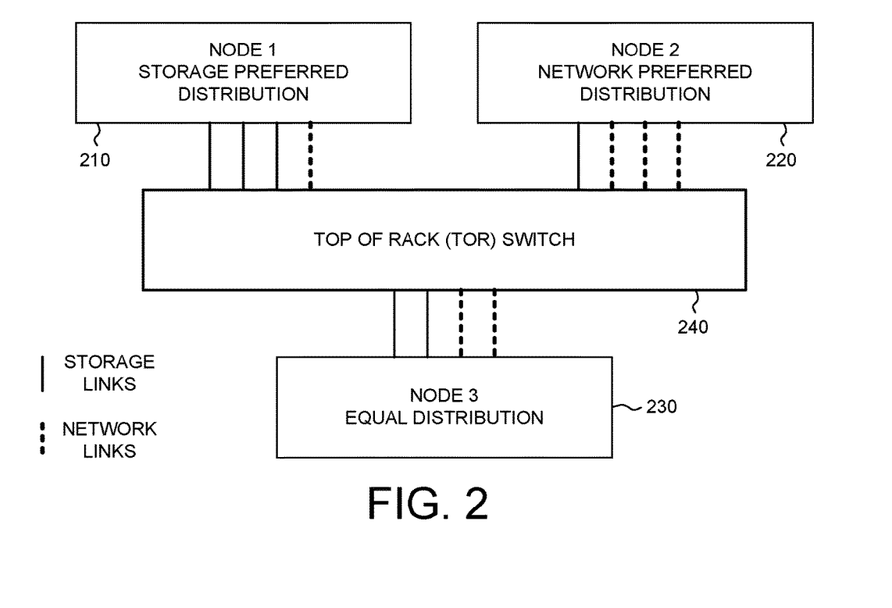
FIG. 2 illustrates a distributed system with distributed flexible scheduling for converged traffic in accordance with one novel aspect.

FIG. 2 illustrates a distributed system with distributed flexible scheduling for converged traffic in accordance with one novel aspect. The distributed system comprises a plurality of nodes including a first node 210, a second node 220, and a third node 230, and a top of rack (ToR) switch 240. Each node comprises a converged IO controller, which dynamically distributes the network traffic and the storage traffic onto four converged links based on the bandwidth requirements of workloads provisioned in a cluster of the distributed system via a flexible scheduler. The flexible scheduler is typically a centralized entity but fulfills the requirements of workloads across a distributed cluster.

In the example of FIG. 2, for node 1, the workloads requiring higher aggregated storage bandwidth. As a result, a storage-preferred distribution is applied, e.g., the storage traffic is pinned to three converged links while the network traffic is pinned to one converted link. For node 2, the workloads requiring higher aggregated network bandwidth. As a result, a network-preferred distribution is applied, e.g., the storage traffic is pinned to one converged link while the network traffic is pinned to three converted links. For node 3, the workloads requiring similar network and storage bandwidth. As a result, an equal distribution is applied, e.g., the storage traffic is pinned to two converged links while the network traffic is also pinned to two converted links.

Figure 3:
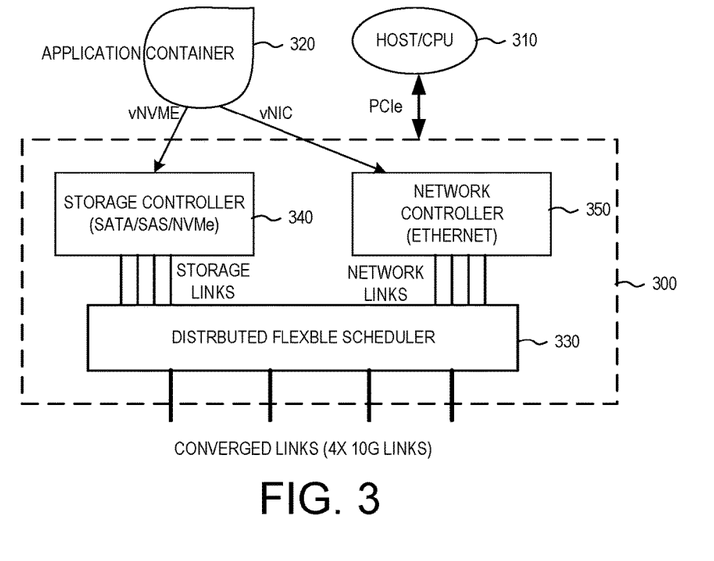
FIG. 3 illustrates a simplified block diagram of a network node having a converged IO controller for distributed flexible scheduling.

FIG. 3 illustrates a simplified block diagram of a converged IO controller 300 for distributed flexible scheduling. Converged IO controller 300 comprises a distributed flexible scheduler 330, a storage (SATA/SAS/NVMe) controller 340, and a network (Ethernet) controller 350. Host/CPU 310 is connected to converged IO controller 300 via PCIe interface. Application container 320 communicates with storage controller 340 via vNVME (virtual Non-Volatile Memory Express), and communicates with to network controller 350 via vNIC (virtual Network Interface Card). The converged IO controller 300 controls both storage media and the Ethernet. In today's existing IO controller, the model is to spread VFs (PCI-e Virtual Functions i.e. vNIC or vNVME) across all four network and storage links based on maximum bandwidth available in the converged link with one network and storage link pinned to each converged link. Problem with this approach is that all four converged links would have some network traffic very quickly making them unsuitable for storage traffic scheduling.

In accordance with one novel aspect, converged IO controller 300 is not just a simple integration of the storage controller and the network controller. Instead, the distributed flexible scheduler 330 prioritizes storage and network traffic and controls both storage and network interfaces. The goals for the converged IO controller is 1) to allow for all 64 networking VFs to be used assuming that sum total of minimum guarantees can be met; 2) to maximize the throughput available for network and storage traffic across four converged links. There is only one basic rule which must be adhered to by the converged IO controller: storage traffic and network traffic cannot be mixed on the same converged link.

Figure 4:
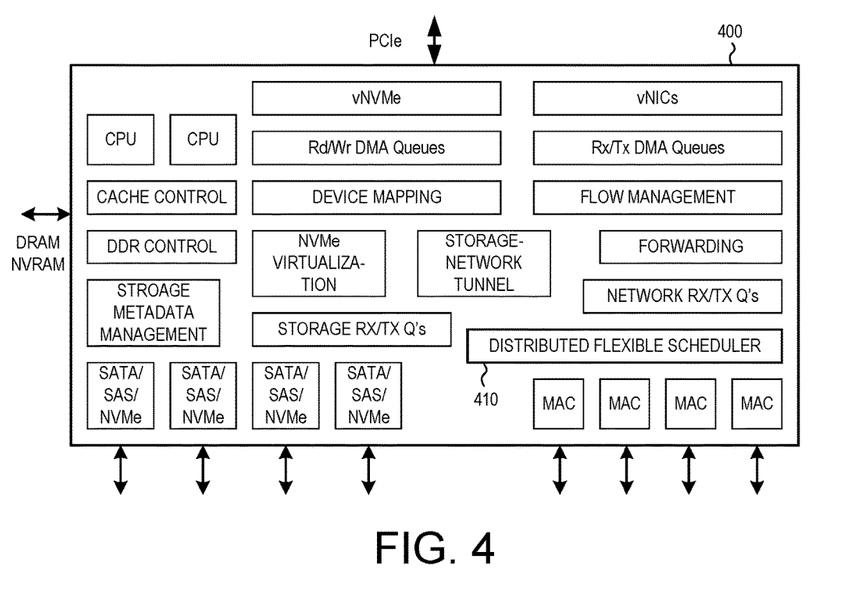
FIG. 4 illustrates a detailed block diagram of a converged IO controller including a distributed flexible scheduler for converged traffic.

FIG. 4 illustrates a detailed block diagram of a converged IO controller 400 including a distributed flexible scheduler 410 for converged traffic. Converged IO controller 400 supports different types of interfaces: PCIe interface to the host/CPU, DRAM/NVRAM interface, storage interface to the storage media, and network interface (Ethernet) to the network fabric. Converged IO controller 400 comprises vNVMe virtual endpoints to the host presenting virtual storage targets to the host; Read and Write DMA queues; Device mapping module that determines the location of the vNVMe devices; NVMe virtualization module that translates NVMe protocol and operations to the backend storage media's protocol and operations; Storage read and write queues; Storage metadata management module; SATA control blocks that provides the interface to the storage media; Storage-Network tunnel that provides the gateway between storage traffic and network traffic; vNICs virtual endpoints to the host presenting virtual network interface cards; Receive and Transmit DMA queues; Flow management module that performs standard network traffic classification; Forwarding module that determines destination of the packet through L2 or L3 means; Network Rx/Tx queues; Distributed flexible scheduler that prioritizes and controls storage and network traffic and interfaces; Ethernet MAC interfaces; Embedded CPU and cache complexes; and DDR controller for the external DRAM/NVRAM. The different modules and circuits can be implemented and configured by hardware, firmware, software, and a combination thereof.

Figure 5:
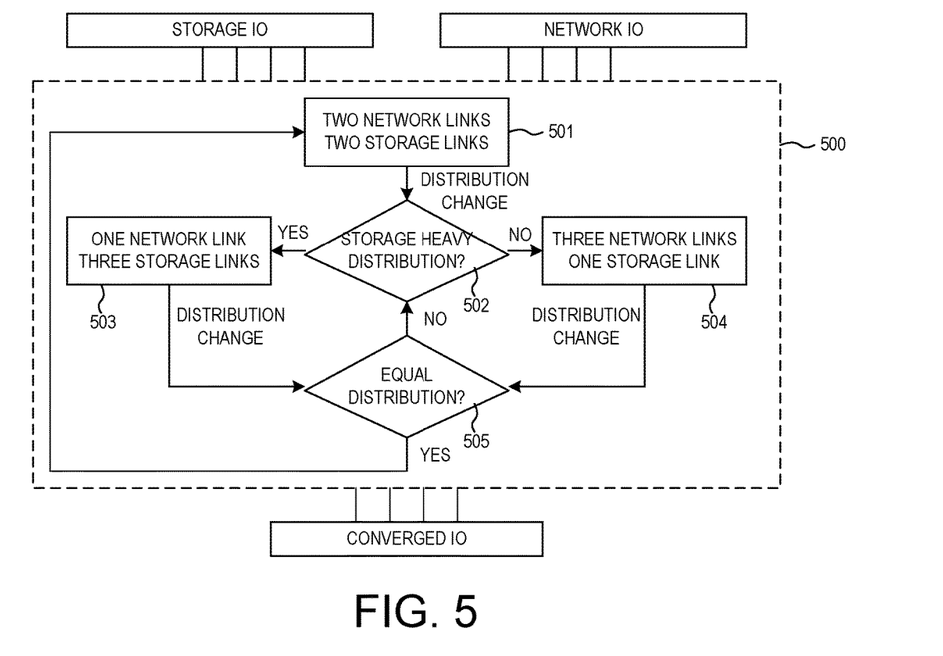
FIG. 5 illustrates a flow chart of a distributed flexible scheduling algorithm for converged traffic in accordance with one novel aspect.

FIG. 5 illustrates a flow chart of a distributed flexible scheduling algorithm for converged traffic in accordance with one novel aspect. In the example of FIG. 5, a converged IO controller 500 supports four storage links, four network links, and four converged links. The controller 500 comprises a distributed flexible scheduler that performs distributed flexible scheduling for converged traffic. In step 501, the scheduler starts with an initial state of equal distribution. Network traffic is pinned to two converged links, and storage traffic is pinned to two converged links. Upon a provisioning a new load or a change in existing load, in step 502, the scheduler determines whether storage heavy distribution should be applied. If the answer is yes, then network traffic is pinned to one converged link, and storage traffic is pinned to three converged links (step 503). If the answer is no, then network traffic is pinned to three converged links, and storage traffic is pinned to one converged link (step 504). From step 503, upon a provisioning change, the scheduler determines whether equal distribution should be applied (step 505). From step 504, upon a provisioning change, the scheduler determines whether equal distribution should be applied (step 505). If the answer to step 505 is yes, then the scheduler goes back to step 502 with equal distribution. Otherwise, the scheduler determines to stay with the previous distribution preference.

In a distributed system using a kubernetes cluster comprising a plurality of nodes, a provisioning happens whenever a "pod" (the kubernetes term for a collection of jobs) is deployed in a node of the cluster or when an existing "pod" finishes thus releasing its resources. Specifically, whenever a "pod" is deployed, it is provided with IO resources (vNIC for network and vNVMe for storage). In the same way, when a "pod" exists, its resources are freed up. The distributed flexible scheduler gets events or is part of the kubernetes scheduler thus knowing when to balance the distribution preference between network links and storage links.

Figure 6:
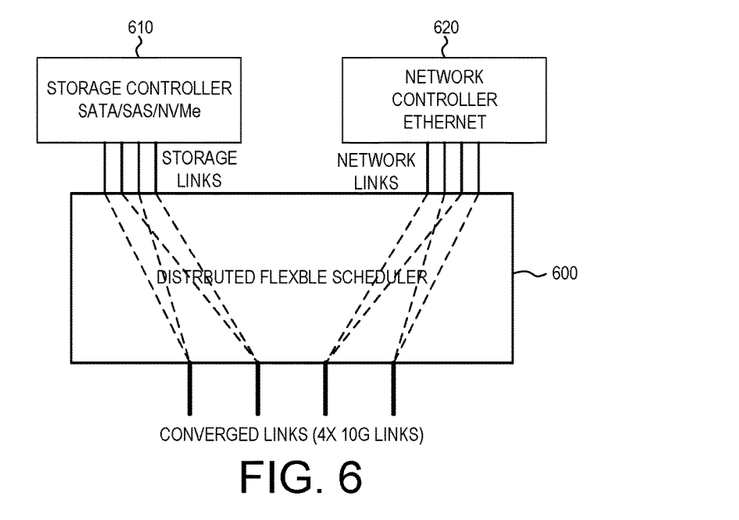
FIG. 6 illustrates an initial state of the scheduler with equal distribution.

FIG. 6 illustrates an initial state of a distributed flexible scheduler 600 with equal distribution. The middle ground is to assume two converged links carry network traffic and two converged link carry storage traffic for an initial state. The scheduler 600 spreads traffic across the four network and storage links while being aware of the bandwidth available in the pinned converged links. In the scheduler, two network links or two storage links are pinned to each converged link (2:1) pinning. Network and storage traffic is never mixed on the same converged link in this approach. This way at least 20G throughput can be achieved and use all 64 VFs on a relatively lightly loaded node while maintaining isolation of network and storage traffic.

Overflow scenarios occur when network or storage traffic needs to be scheduled beyond the first two converged links because the total bandwidth needed for that category exceeds what can be allocated on the first two converged links. When scheduling overflows, the scheduler 1) must reserve at least one converged link for carrying storage traffic where no network traffic is mixed; and 2) must reserve at least one converged link for carrying network traffic where no storage traffic is mixed. These rules effectively mean that the sum total of the minimum guarantees for network or storage traffic on a given node cannot exceed 30G and must be schedulable across three converged links.

Figure 7:
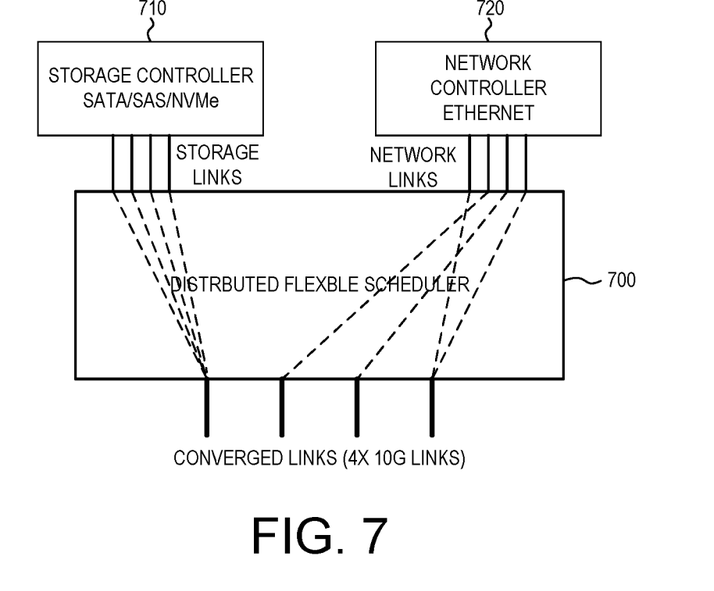
FIG. 7 illustrates a network overflow scenario with a network preferred distribution.

FIG. 7 illustrates a network overflow scenario with a network preferred distribution. Upon a provisioning change, the scheduler determines whether network heavy distribution should be applied. If so, storage traffic is scheduled on one converged link and network traffic is scheduled on three converged links. As depicted in FIG. 7, all four storage links are pinned to one converged link and all four network links are distributed across three converged links. Scheduling an extra link for network traffic will be possible only when all of these conditions hold: 1) Sum total of minimum guarantees on all storage traffic<=10G; AND 2) Sum total of minimum guarantees on at least two of the four network links<=10G (hence they can be pinned to one converged link). If either of these conditions are not met, scheduling will fail. If scheduling succeeds, this will result in redistribution of storage and network traffic. Gratuitous ARPs (Address resolution protocol) need to be sent for network traffic and BTP (Burst transmission protocol) pings need to be sent for storage traffic to move the MACs to the correct interface on the ToR switch.

Figure 8:
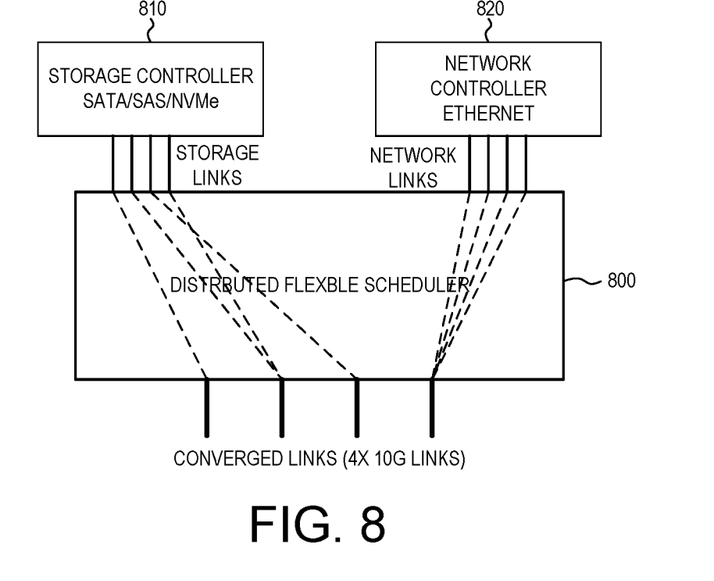
FIG. 8 illustrates a storage overflow scenario with a storage preferred distribution.

FIG. 8 illustrates a storage overflow scenario with a storage preferred distribution. Upon a provisioning change, the scheduler determines whether storage heavy distribution should be applied. If so, storage traffic is scheduled on three converged links and network traffic is scheduled on one converged link. As depicted in FIG. 8, all four network links are pinned to one converged link and all four storage links are distributed across three converged links. Scheduling an extra link for storage traffic will be possible only when all of these conditions hold: 1) Sum total of minimum guarantees on all network traffic<=10G; AND 2) Sum total of minimum guarantees on at least two of the four storage links<=10G (hence they can be pinned to one converged link). If either of these conditions are not met, scheduling will fail. If scheduling succeeds, this will result in redistribution of storage and network traffic. Gratuitous ARPs need to be sent for network traffic and BTP pings need to be sent for storage traffic to move the MACS to the correct interface on the ToR switch.

Failover occurs when the converged links go down resulting in re-pinning of network and storage links to converged links within the converged IO controller. The basic rule of not mixing network and storage traffic on the same link should not be broken except in the scenario where 3 out of 4 converged links are down. All possible scenarios are discussed below. Please note that since minimum guarantees were made with the assumption of four links being up, so it will run in degraded mode. Subsequent scheduling decisions will be made based on the distribution picked in these scenarios.

Figure 9:
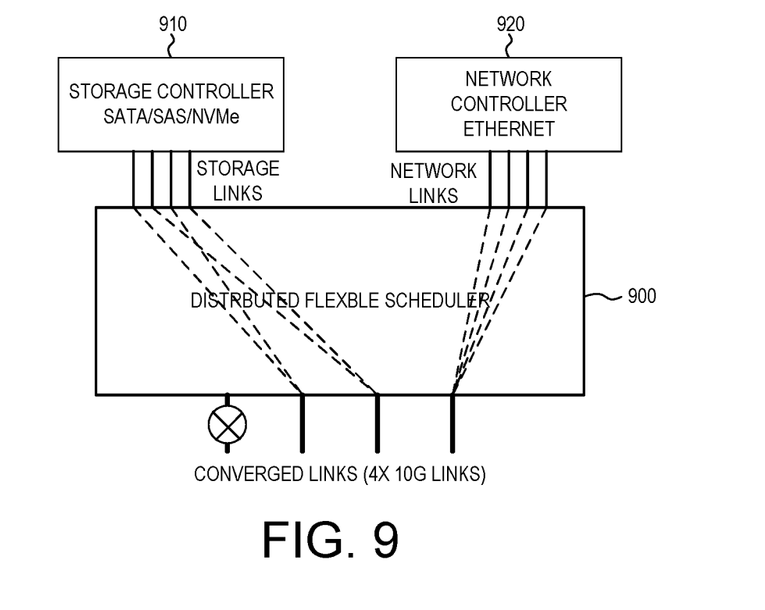
FIG. 9 illustrates a failover scenario with one failed converged link and a storage preferred re-distribution.

FIG. 9 illustrates a failover scenario with one failed converged link and a storage preferred re-distribution. With one failed converged link and a storage preferred re-distribution, storage traffic is scheduled on two converged links and network traffic is scheduled on one converged links. As depicted in FIG. 9, there is 2:1 pinning of storage traffic and 4:1 pinning of network traffic. Storage preferred re-distribution will occur when one of these hold: 1) Sum total of minimum guarantees on all network traffic<=10G; OR 2) Sum total of minimum guarantees for storage traffic>=Sum total of minimum guarantees for network traffic.

In one scenario, the sum total of minimum guarantees of three of the four storage links<=10G, while the 4th storage link when combined with any of the other three becomes >10G. In this case, a combination of 3:1 pinning+1:1 pinning for storage traffic can be used to meet the guarantees accurately.

Figure 10:
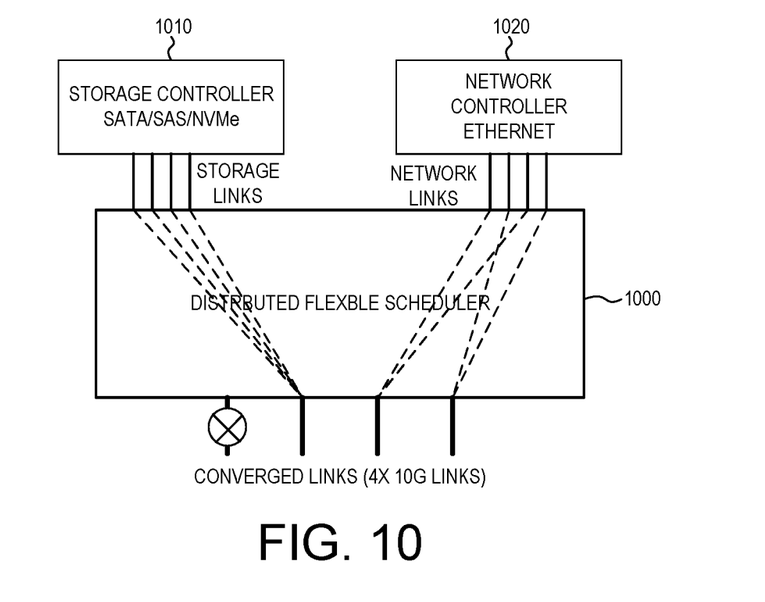
FIG. 10 illustrates a failover scenario with one failed converged link and a network preferred re-distribution.

FIG. 10 illustrates a failover scenario with one failed converged link and a network preferred re-distribution. With one failed converged link and a network preferred re-distribution, network traffic is scheduled on two converged links and storage traffic is scheduled on one converged links. As depicted in FIG. 10, there is 2:1 pinning of network traffic and 4:1 pinning of storage traffic. Network preferred re-distribution will occur when one of these hold: 1) Sum total of minimum guarantees on all storage traffic<10G; OR 2) Sum total of minimum guarantees for network traffic>Sum total of minimum guarantees for storage traffic.

In one scenario, the sum total of minimum guarantees of three of the four network links<=10G, while the 4th network link when combined with any of the other three becomes>10G. In this case, a combination of 3:1 pinning+1:1 pinning for network traffic can be used to meet the guarantees accurately.

Figure 11:
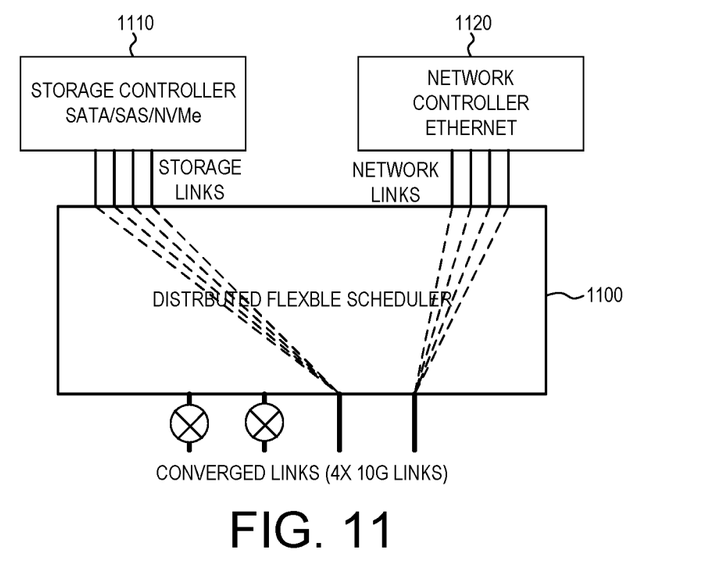
FIG. 11 illustrates a failover scenario with two failed converged links and equal re-distribution.

FIG. 11 illustrates a failover scenario with two failed converged links and equal re-distribution. When only two converged links are up, the scheduler will reserve one converged link for network and the other for storage. As depicted in FIG. 11, there is 4:1 pinning of storage traffic and 4:1 pinning of network traffic. Minimum guarantees will not be met, but QoS will not be broken due to network and storage traffic interfering with each other in the ToR switch.

Figure 12:
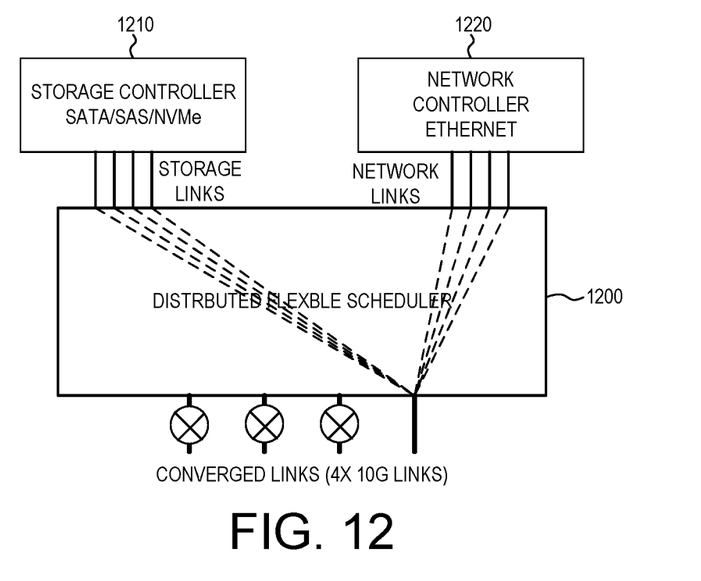
FIG. 12 illustrates a failover scenario with three failed converged links.

FIG. 12 illustrates a failover scenario with three failed converged links. In this scenario, the scheduler has no choice but to pin all network and storage traffic onto the one converged link that is up. As depicted in FIG. 12, all storage and network traffic are carried on the same converged link. There is 8:1 pinning to the same converged link. Interference between network and storage traffic at the ToR will break QoS. Only functional correctness is guaranteed here.

Figure 13:
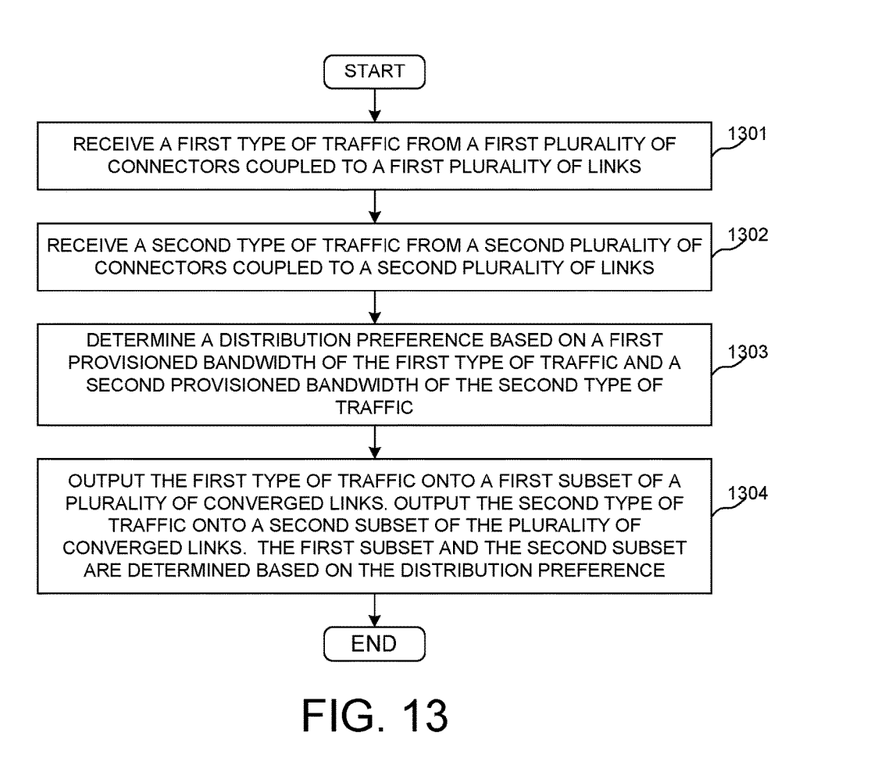
FIG. 13 is a flow chart of a method of distributed flexible scheduling for converged traffic in accordance with one novel aspect.

FIG. 13 is a flow chart of a method of distributed flexible scheduling for converged traffic in accordance with one novel aspect. In step 1301, a converged IO controller receives a first type of traffic from a first plurality of connectors coupled to a first plurality of links. In step 1302, the controller receives a second type of traffic from a second plurality of connectors coupled to a second plurality of links. In step 1303, the controller determines a distribution preference based on a first provisioned bandwidth of the first type of traffic and a second provisioned bandwidth of the second type of traffic. In step 1304, the controller outputs the first type of traffic onto a first subset of a plurality of converged links, and outputs the second type of traffic onto a second subset of the plurality of converged links. The first subset and the second subset are determined based on the distribution preference.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
receiving a first type of traffic from a first plurality of connectors coupled to a first plurality of links, wherein the first type of traffic is a storage type of traffic;

receiving a second type of traffic from a second plurality of connectors coupled to a second plurality of links, wherein the second type of traffic is a network type of traffic;

determining a distribution preference based on a first provisioned bandwidth of the first type of traffic and a second provisioned bandwidth of the second type of traffic; and outputting the first type of traffic onto a first subset of a plurality of converged links, and outputting the second type of traffic onto a second subset of the plurality of converged links, wherein the first subset and the second subset are determined based on the distribution preference, wherein a storage-preferred distribution is determined when the first provisioned bandwidth exceeds half of a total bandwidth of the converged links, and wherein at least one converged link is reserved for the network type of traffic.

2. The method of claim 1, wherein the first plurality of links is a storage link comprising a Non-Volatile Memory express (NVMe) over Ethernet link.

3. The method of claim 1, wherein the second plurality of links is a network link comprising an Ethernet link.

4. The method of claim 1, wherein at least one of the converged links fails, wherein the first type of traffic and the second type of traffic are pinned to the remaining converged links based on the distribution preference.

5. A method, comprising:
receiving a first type of traffic from a first plurality of connectors coupled to a first plurality of links, wherein the first type of traffic is a storage type of traffic;

receiving a second type of traffic from a second plurality of connectors coupled to a second plurality of links, wherein the second type of traffic is a network type of traffic;

determining a distribution preference based on a first provisioned bandwidth of the first type of traffic and a second provisioned bandwidth of the second type of traffic; and outputting the first type of traffic onto a first subset of a plurality of converged links, and outputting the second type of traffic onto a second subset of the plurality of converged links, wherein the first subset and the second subset are determined based on the distribution preference, wherein a network-preferred distribution is determined when the second provisioned bandwidth exceeds half of a total bandwidth of the converged links, and wherein at least one converged link is reserved for the storage type of traffic.

6. The method of claim 5, wherein the first plurality of links is a storage link comprising a Non-Volatile Memory express (NVMe) over Ethernet link.

7. The method of claim 5, wherein the second plurality of links is a network link comprising an Ethernet link.

8. The method of claim 5, wherein at least one of the converged links fails, wherein the first type of traffic and the second type of traffic are pinned to the remaining converged links based on the distribution preference.

9. A converged IO controller, comprising:
a first plurality of connectors coupled to a first plurality of links for receiving a first type of traffic that is a storage type of traffic;

a second plurality of connectors coupled to a second plurality of links for receiving a second type of traffic that is a network type of traffic;

a plurality of converged connectors coupled to a plurality of converged links; and a scheduler that determines a distribution preference based on a first provisioned bandwidth of the first type of traffic and a second provisioned bandwidth of the second type of traffic, wherein the first type of traffic is pinned to a first subset of a plurality of converged links, and the second type of traffic is pinned to a second subset of the plurality of converged links, and wherein the first subset and the second subset are determined based on the distribution preference, wherein a storage-preferred distribution is determined when the first provisioned bandwidth exceeds half of a total bandwidth of the converged links, and wherein at least one converged link is reserved for the network type of traffic.

10. The controller of claim 9, wherein the first plurality of links is a storage link comprising a Non-Volatile Memory express (NVMe) over Ethernet link.

11. The controller of claim 9, wherein the second plurality of links is a network link comprising an Ethernet link.

12. The controller of claim 9, wherein at least one of the converged links fails, wherein the first type of traffic and the second type of traffic are pinned to the remaining converged links based on the distribution preference.

13. A converged IO controller, comprising:
a first plurality of connectors coupled to a first plurality of links for receiving a first type of traffic that is a storage type of traffic;

a second plurality of connectors coupled to a second plurality of links for receiving a second type of traffic that is a network type of traffic;

a plurality of converged connectors coupled to a plurality of converged links; and a scheduler that determines a distribution preference based on a first provisioned bandwidth of the first type of traffic and a second provisioned bandwidth of the second type of traffic, wherein the first type of traffic is pinned to a first subset of a plurality of converged links, and the second type of traffic is pinned to a second subset of the plurality of converged links, and wherein the first subset and the second subset are determined based on the distribution preference, wherein a network-preferred distribution is determined when the second provisioned bandwidth exceeds half of a total bandwidth of the converged links, and wherein at least one converged link is reserved for the storage type of traffic.

14. The controller of claim 13, wherein the first plurality of links is a storage link comprising a Non-Volatile Memory express (NVMe) over Ethernet link.

15. The controller of claim 13, wherein the second plurality of links is a network link comprising an Ethernet link.

16. The controller of claim 13, wherein at least one of the converged links fails, wherein the first type of traffic and the second type of traffic are pinned to the remaining converged links based on the distribution preference.

* * * * *